(12) United States Patent
Sahashi

(10) Patent No.: US 8,807,647 B2
(45) Date of Patent: Aug. 19, 2014

(54) VEHICLE SEAT

(75) Inventor: Hideo Sahashi, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 13/448,664

(22) Filed: Apr. 17, 2012

(65) Prior Publication Data

US 2012/0267937 A1     Oct. 25, 2012

(30) Foreign Application Priority Data

Apr. 20, 2011    (JP) ................................ 2011-094101

(51) Int. Cl.
     *A47C 7/74*        (2006.01)

(52) U.S. Cl.
     USPC ................. 297/180.13; 297/180.14

(58) Field of Classification Search
     USPC .............. 297/180.13, 180.14, 452.46, 452.47
     See application file for complete search history.

(56) References Cited

U.S. PATENT DOCUMENTS 7,618,089 B2 * 11/2009 Stoewe et al. ............. 297/180.13
7,963,595 B2 * 6/2011 Ito et al. .................... 297/180.13
2006/0060344 A1    3/2006 Esaki
2009/0152909 A1 * 6/2009 Andersson .......... 297/180.13 X
2011/0133525 A1    6/2011 Oota

FOREIGN PATENT DOCUMENTS

| JP | 2002-186794 | 7/2002 |
|---|---|---|
| JP | 2004-8334 | 1/2004 |
| JP | 2010-104485 | 5/2010 |

OTHER PUBLICATIONS

U.S. Appl. No. 13/440,181 to Hideo Sahashi, filed Apr. 5, 2012.
U.S. Appl. No. 13/440,202 to Hideo Sahashi, filed Apr. 5, 2012.
Chinese Office action, dated Jan. 27, 2014, along with an English-language translation thereof.

* cited by examiner

*Primary Examiner* — Anthony D Barfield
(74) *Attorney, Agent, or Firm* — Greenblum & Bernstein, P.L.C.

(57) ABSTRACT

In a vehicle seat in which a first member is arranged on a surface of a seat structure member and tucked into a recessed portion, and air blown out from a blower is blown at a seating side of the seat structure member via a flow path portion of a cushion, the flow path portion is provided in a portion of the cushion that is offset from a position where the recessed portion is formed.

9 Claims, 7 Drawing Sheets

VEHICLE SEAT

INCORPORATION BY REFERENCE

The disclosure of Japanese Patent Application No. 2011-094101 filed on Apr. 20, 2011 including the specification, drawings and abstract is incorporated herein by reference in its entirety.

BACKGROUND OF THE INVENTION

1. Field of the Invention

The invention relates to a vehicle seat provided with a blower therein.

2. Description of Related Art

One such vehicle seat is a well-known vehicle seat that includes a seat cushion, a seat back, and a blower (see Japanese Patent Application Publication No. 2004-8334 (JP 2004-8334 A)). The blower includes a centrifugal blower mechanism (i.e., a mechanism that blows air in the centrifugal direction while drawing in outside air from the axial direction of the apparatus). Also, the seat cushion includes a cushion that forms the outer shape (i.e., the contour) of the seat, a flow path portion inside the cushion, and a cover made of fabric. The cushion is an elastic member capable of supporting an occupant, and may be made with polyurethane foam (resin foam that has an intersecting cell structure).

The flow path portion has a communicating portion, an air hole, and a cover member. The communicating portion is a linear recessed portion on the back (i.e., the underside) of the cushion. Also, the air hole is such that one end is open to the seating side of the cushion and the other end is connected to the communicating portion. Also, the cover member is a planar-shaped member that is arranged on the back of the cushion, and has a hole that communicates the blower with the communicating portion. In the related art, the seating surface of the cushion is covered by the cover while the back of the cushion (i.e., the air hole and the communicating portion) is covered by the cover member. Next, the blower is communicated with the communicating portion via the hole, while being arranged below the seat cushion. Air blown out from the blower is blown at an occupant through the flow path portion (i.e., the hole, the communicating portion, and the air hole) of the cushion.

Here, with the vehicle seat described above, it is preferable that a portion of the cover is able to be retained by the cushion when covering the cushion with the cover. For example, with Japanese Patent Application Publication No. 2002-186794 (JP 2002-186794 A), a portion of the cover is retained in a recessed portion on the seating side of the cushion by a retaining structure formed by a retaining portion, a retained portion, and a ring member. The ring member is a generally C-shaped linear member, and is closed (to form a general O-shape) by a tool or the like. The retaining portion is a structure that continues on from the cover, and includes a first wire and band-shaped cloth material. The cloth material is folded in and attached to a portion of the cover, and the first wire is inserted therein. Also, the retained portion is a structure that continues on from the cushion, and includes a second wire. The second wire is embedded in the cushion and arranged so as to face the first wire. Also, a portion of the second wire is exposed from a recessed portion (a recessed portion on the seating side of the cushion). With the related art, the first wire and the second wire are first passed through the ring member while a portion of the cover is tucked into the recessed portion, and then the ring member is closed. As a result, a portion of the cover is able to be retained in the recessed portion of the cushion, while the cushion is covered by the cover.

However, with the related art, the cushion has the recessed portion on the seating side, and the communicating portion on the back side. Therefore, the cushion becomes extremely thin (i.e., the thickness dimension becomes extremely small) at the portion where the recessed portion and the communicating portion overlap, so air may leak out. That is, the structure would have somewhat poor blowing efficiency. Of course, the thickness dimension of the cushion could be maintained by omitting the recessed portion on the seating side, but doing so would result in a structure that is somewhat inconvenient when assembling the seat. That is, the structure would have poor seat performance.

SUMMARY OF THE INVENTION

The invention thus provides a vehicle seat that efficiently leads blown air from a blower to a seating side, while maintaining seat performance as much as possible.

A first aspect of the invention relates to a vehicle seat that includes a seat structure member and a first member that is arranged on a surface of the seat structure member. The seat structure member includes a cushion that forms a contour of a seat and elastically supports an occupant, a blower arranged in the seat structure member, a groove provided on a seating side of the cushion, and a recessed portion formed in a bottom surface of the groove. Also, in this aspect, a portion of the first member is tucked into the recessed portion. Further, a flow path portion through which air blown out from the blower is blown to the seating side is formed in the cushion.

With this type of seat structure, it is preferable that the blown air from the blower be efficiently led to the seating side, while seat performance (e.g., convenience during assembly) is maintained as much as possible. Therefore, in this aspect, the flow path portion is provided in a portion of the cushion that is offset from a position where the recessed portion is formed. Therefore, the blown air from the blower can be led to the seating side without making the thickness of the cushion extremely thin. That is, the structure has good blowing efficiency.

In the vehicle seat according to the aspect described above, the cushion may include a first cushion portion that forms the seating side, the recessed portion provided on a seating side of the first cushion portion, and a second cushion portion that is made of the same material as the first cushion portion. Also, the flow path portion may include a first air hole that passes through the first cushion portion, a communicating portion provided between the first cushion portion and the second cushion portion, and a second air hole that passes through the second cushion portion and is able to be communicated with the blower. Also, the second cushion portion may be arranged abutting against a back surface of the first cushion portion that is on a side opposite the seating side, and air that is blown out from the blower may be led to the seating side of the cushion by the first air hole being communicated with the second air hole by the communicating portion. With this structure, forming the flow path portion by the first cushion portion and the second cushion portion (that are made of the same material) enables seating performance (e.g., seating comfort) and the like to be well maintained.

Thus, the aspect described above enables blown air from a blower to be efficiently led to a seating side, while maintaining seat performance as much as possible.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
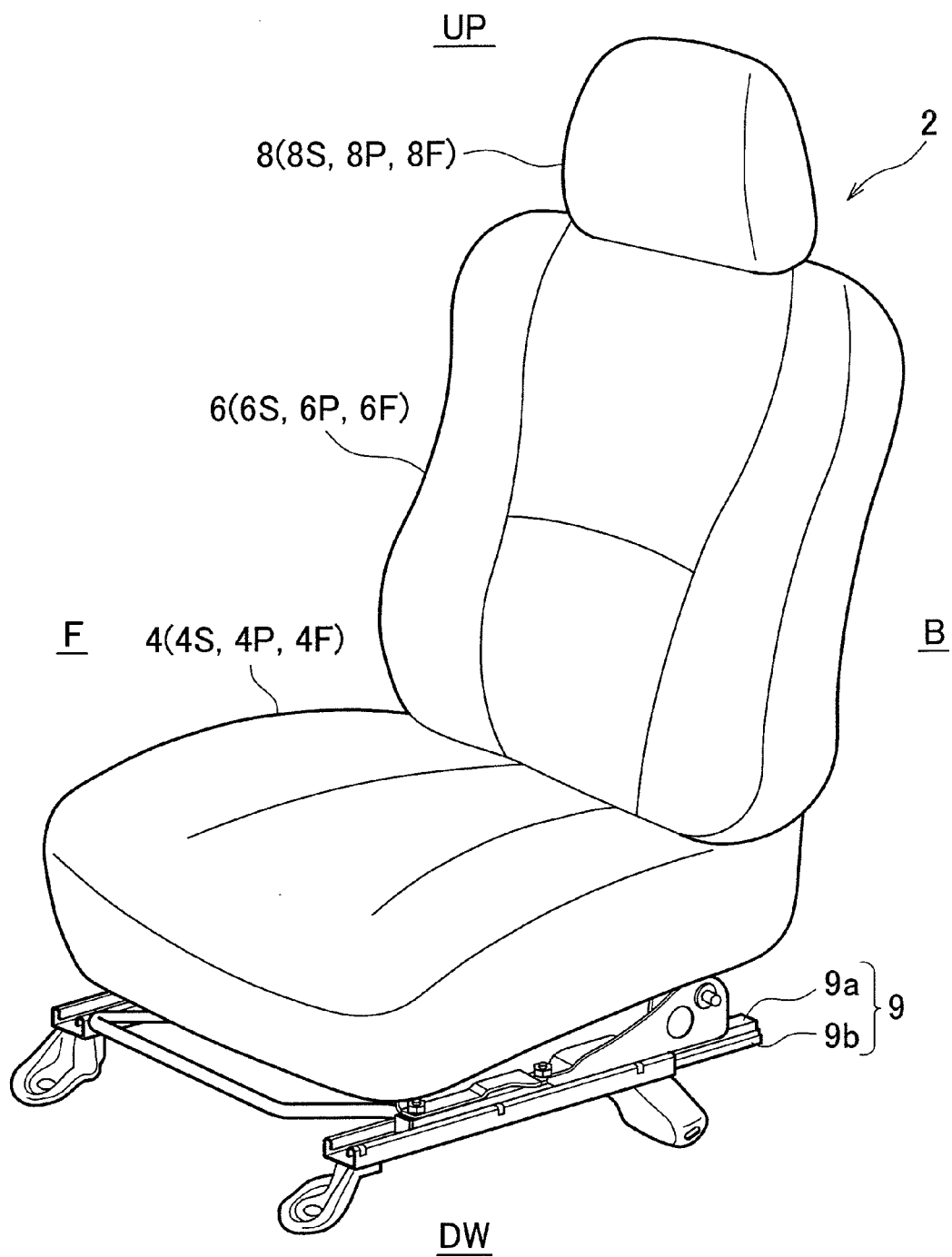
FIG. 1 is a perspective view of a vehicle seat.

Hereinafter, an example embodiment of the invention will be described with reference to FIGS. 1 to 7. In the drawings, for convenience, reference character F denotes a forward direction with respect to the vehicle seat, reference character B denotes a backward or rearward direction with respect to the vehicle seat, reference character UP denotes an upward direction with respect to the vehicle seat, and reference character DW denotes a downward direction with respect to the vehicle seat. A vehicle seat 2 in FIG. 1 has i) seat structure members that include a seat cushion 4, a seat back 6, and a headrest 8, and ii) a rail member 9. Each of these seat structure members has a frame member (4F, 6F, and 8F) that forms a seat frame, a cushion (4P, 6P, and 8P) that forms the outer shape (i.e., the contour) of the seat, and a cover (4S, 6S and 8S) that covers the surface of the seat. Also, the rail member 9 includes an upper rail 9a, and a lower rail 9b that is slidably mounted to the upper rail 9a. The vehicle seat 2 is able to slide on the lower rail 9b by attaching the seat cushion 4 to the upper rail 9a.

The seat cushion 4 includes basic structures (i.e., 4F, 4P, 4S), the blower 40, a plurality of grooves 21a, 21b, and 22, a recessed portion 24, and a flow path portion 80. In this example embodiment, the cushion 4P is arranged on the frame member 4F and the cushion 4P is covered by the cover 4S. At this time, a portion of the cover (an inner lapped portion 13) is able to be retained in the recessed portion 24 while being tucked into the plurality of grooves 21a, 21b, and 22. That is, the structure is convenient during assembly. Also, air that is blown out from the blower 40 is blown at an occupant through the flow path portion 80 of the cushion 4P. With this type of seat structure, it is preferable that the blown air from the blower 40 be efficiently led to the seating side while seat performance (e.g., convenience) is maintained as much as possible. Therefore, in this example embodiment, blown air from the blower 40 is efficiently led to the seating side while maintaining seat performance as much as possible with the structure described below. The various structures will now be described in detail.

Figure 2:
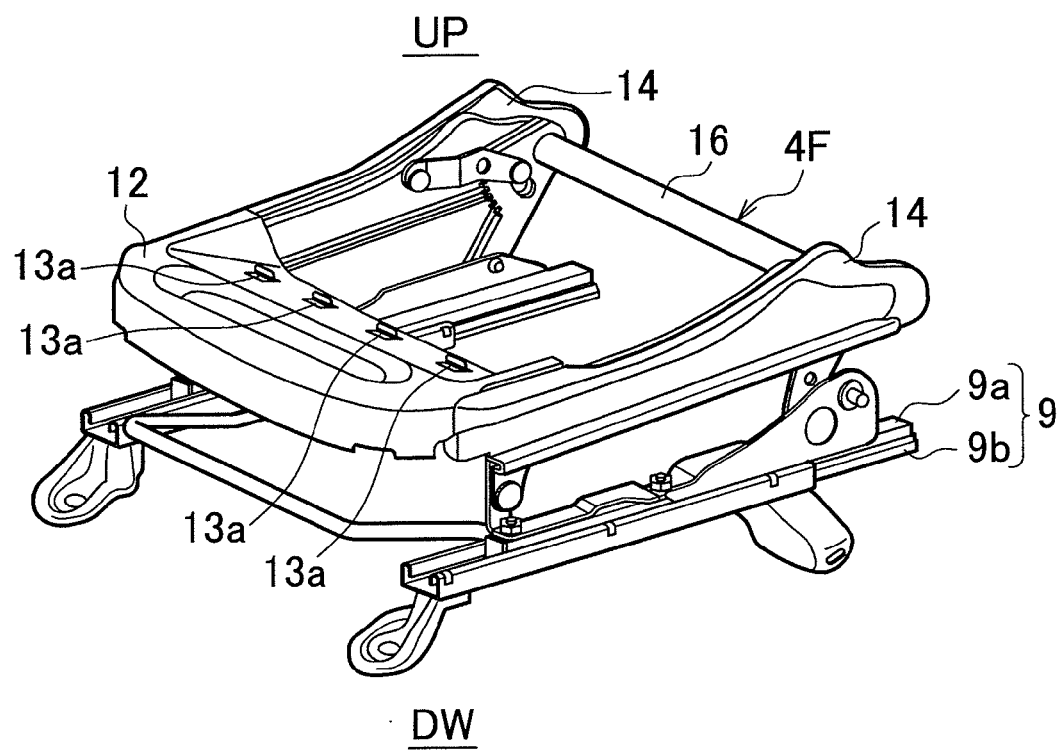
FIG. 2 is a perspective view of a frame member.
Figure 6:
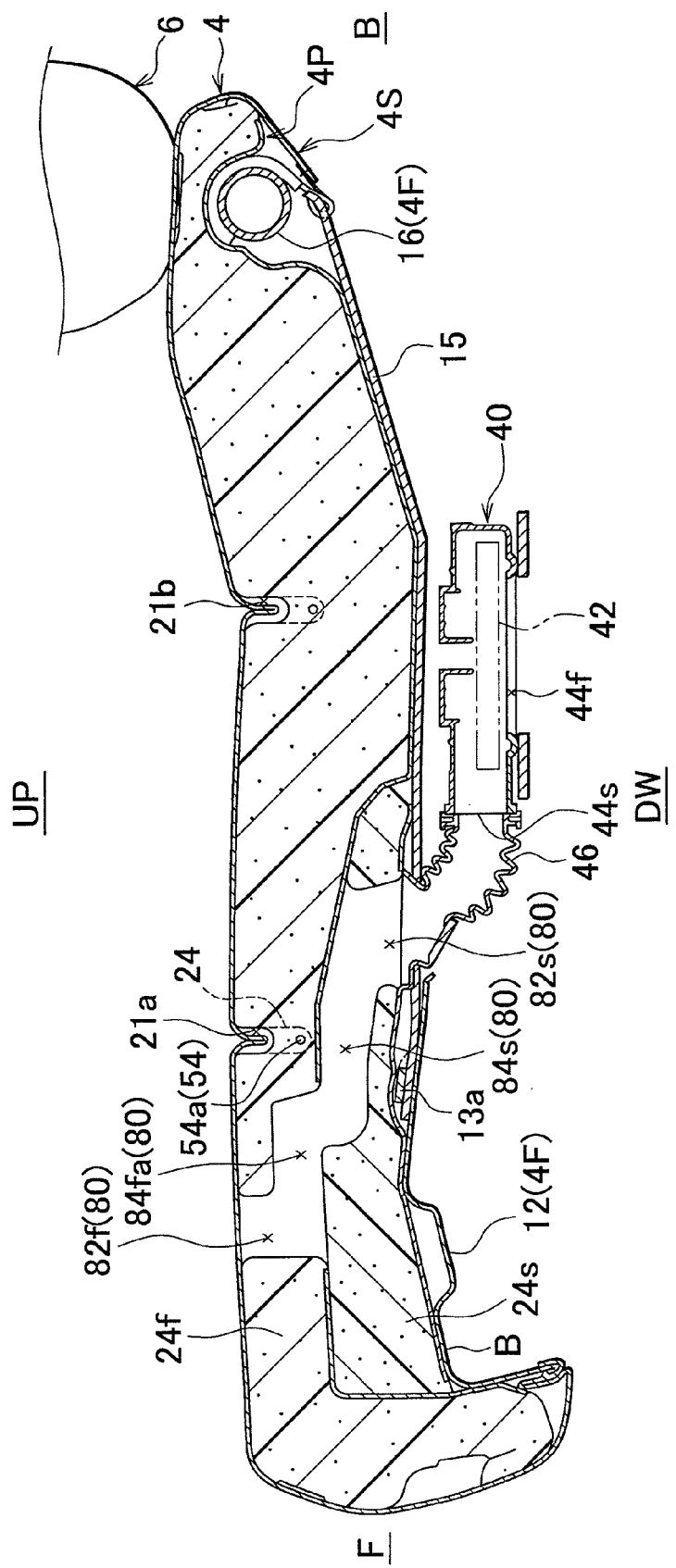
FIG. 6 is a longitudinal sectional view of the seat cushion.

The frame member 4F is a generally rectangular frame member, and includes a front frame 12, a pair of side frames 14, a rear frame 16, and a support member 15 (see FIGS. 2 and 6). The front frame 12 is a member that forms a front portion of the seat cushion 4, and includes hooked protrusions 13a. The hooked protrusions 13a are flat plate portions (each having a generally inverted L-shape) that protrude above the front frame 12. The hooked protrusions 13a stand erect from the front frame 12 and are bent toward the front of the seat. Also, the pair of side frames 14 are flat plate members that form side portions of the seat cushion 4, and are arranged facing each other on the sides of the seat. The rear frame 16 is a rod-shaped member that supports a rear portion of the frame member 4F, and extends between the pair of side frames 14. The support member 15 is a linear (having a continuous S-shape when viewed from above) member that extends between the front frame 12 and the rear frame 16 (see FIG. 6). A front portion of the support member 15 extends in the seat width direction, and is hooked onto the front frame 12 (i.e., the hooked protrusions 13a). Also, a rear portion of the support member 15 is generally J-shaped and is hooked onto the rear frame 16.

The cushion 4P is a member (that is generally rectangular) that forms the contour of the seat and elastically supports an occupant. The cushion 4P includes a first cushion portion 24f and a second cushion portion 24s (see FIGS. 3 to 6). Here, the material of the cushion 4P is not particularly limited, but may be, for example, resin such as polyurethane foam. In this example embodiment, the first cushion portion 24f and the second cushion portion 24s are formed out of the same material, which enables the seating comfort of the seat to be well maintained. A backing layer B (i.e., a protective layer made of resin) may be formed on the back surface of the cushion 4P.

Figure 3:
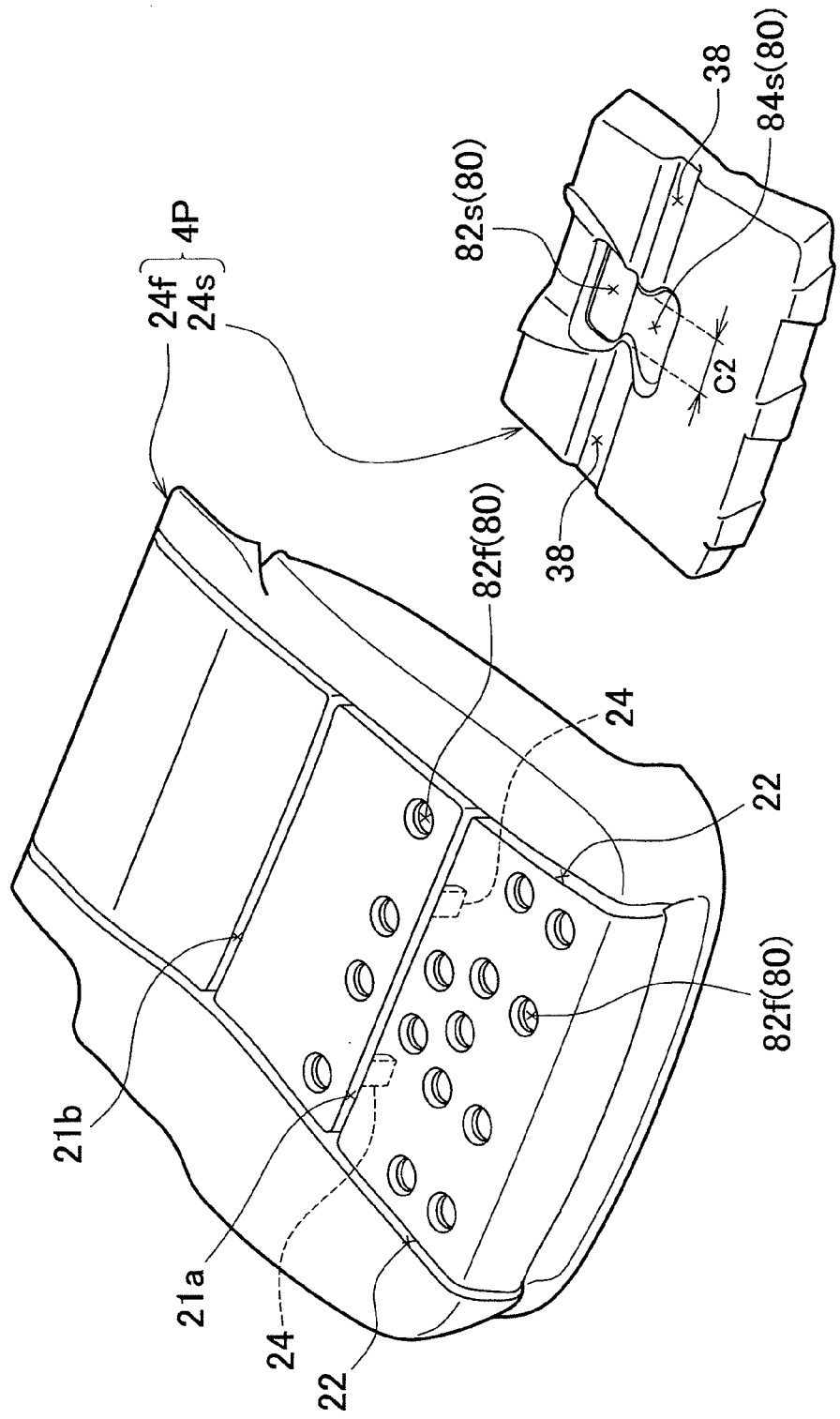
FIG. 3 is an exploded perspective view of a cushion.
Figure 4:
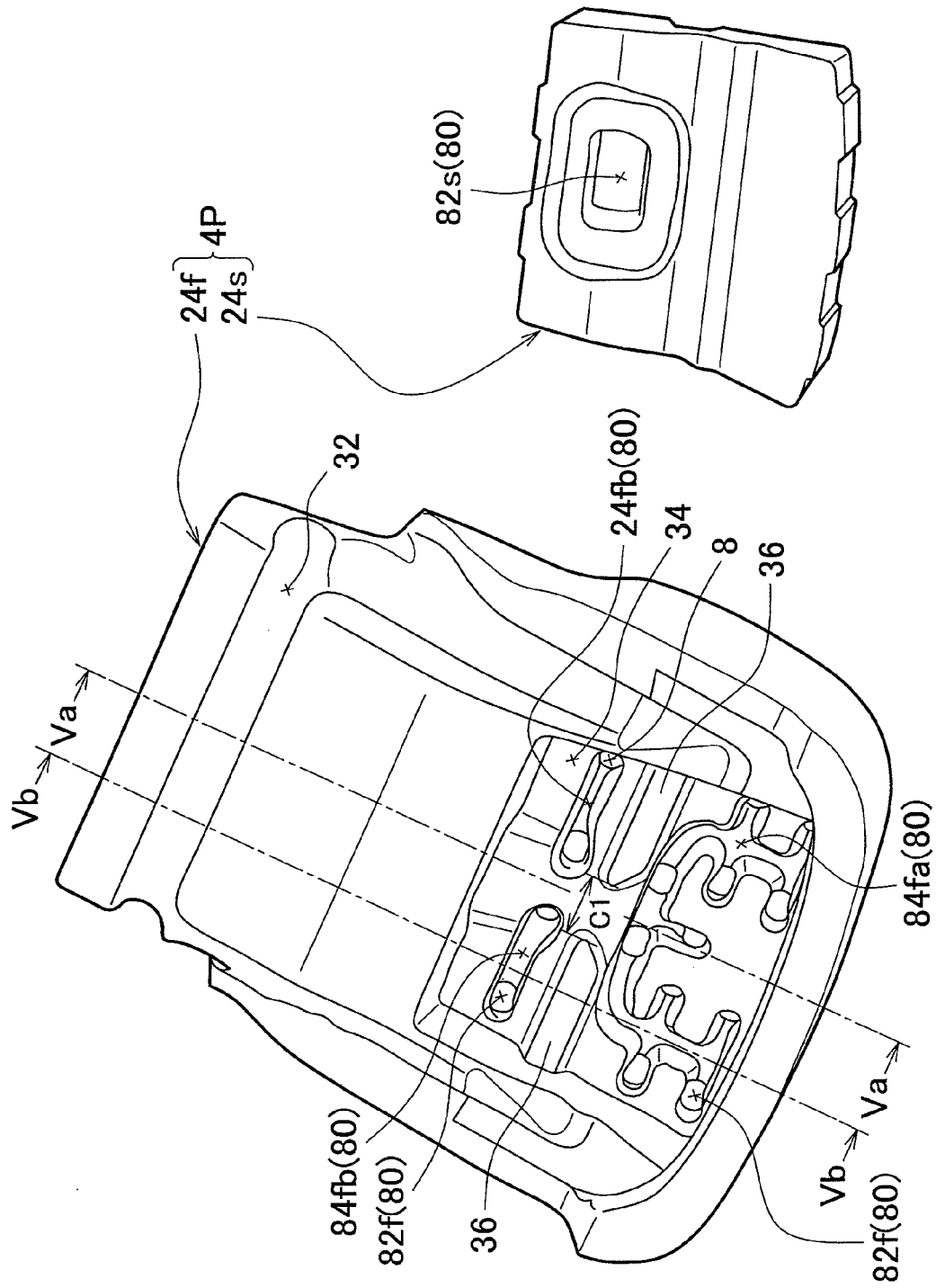
FIG. 4 is an exploded perspective view of the seat cushion from another angle.
Figure 5A:
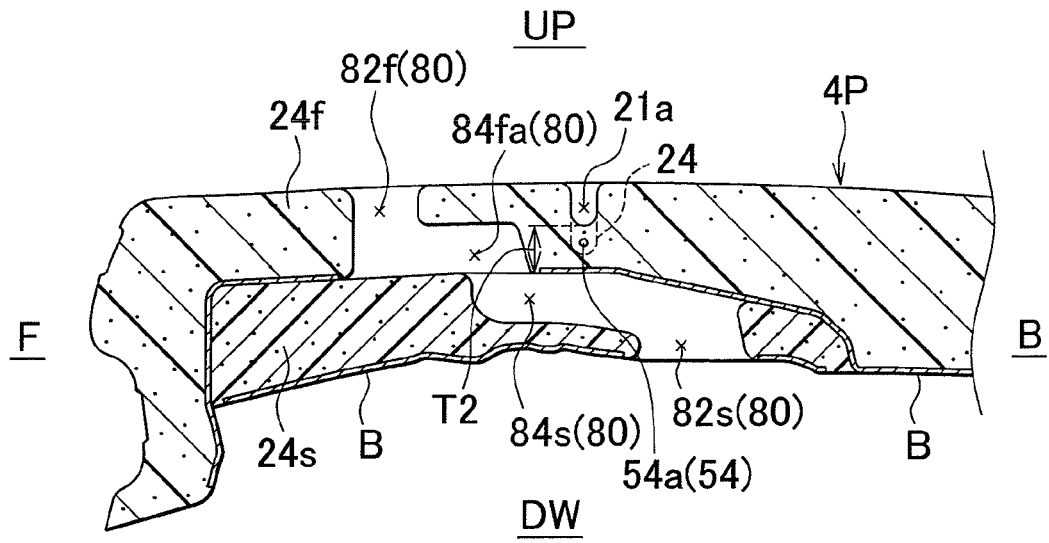
FIG. 5A is a sectional view taken along line Va-Va in FIG. 4.
Figure 5B:
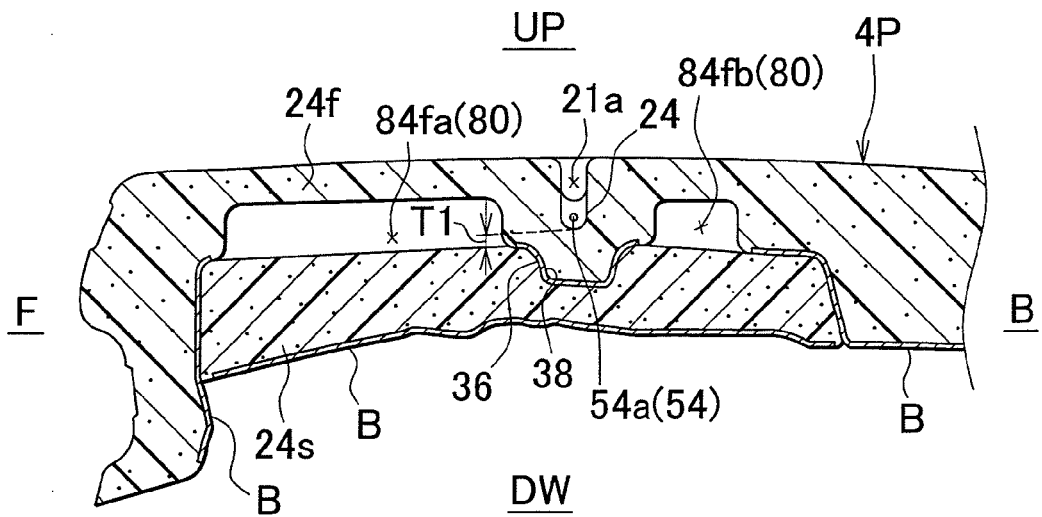
FIG. 5B is a sectional view taken along line Vb-Vb in FIG. 4.

The first cushion portion 24f is a member (that is generally rectangular) that forms the seating side of the cushion 4P (see FIGS. 3 to 5). The first cushion portion 24f in this example embodiment includes the structures of a catch portion 32, a housing portion 34, a mounting portion 36, and a flow path portion 80 that will be described later. The catch portion 32 is a portion that the rear frame 16 fits into, and is formed on the back surface (i.e., underneath side) of the rear portion of the first cushion portion 24f. The catch portion 32 of this example embodiment is a concave portion (that is generally semicircular in a sectional view) that extends in the seat width direction. Also, the housing portion 34 is a recessed area (that is generally rectangular) that the second cushion portion 24s that will be described later fits into. Also, the mounting portion 36 is a protruding portion on the bottom surface of the housing portion 34 (i.e., a protrusion when viewed from the back surface (i.e., the underside) of the seat cushion; see FIG. 4), and is able to fit together with the second cushion portion 24s (i.e., a mountable portion 38) that will be described later. In this example embodiment, a pair of mounting portions 36 (that are linear) are provided extending toward the center from the side walls of the housing portion 34 (i.e., in the seat width direction), and a gap (a clearance C1) that enables the flow path portion 80 that will be described later to be formed is provided between the two mounting portions 36.

The plurality of grooves (i.e., first grooves 21a and 21b, and second grooves 22) are all linear concave portions that are drilled on the seating side of the first cushion portion 24f (see FIGS. 3 to 5). The first grooves 21a and 21b are concave portions that extend in the seat width direction. The second grooves 22 are concave portions that extend in the seat longitudinal direction. Also, the recessed portion 24 is a recessed area provided in the bottom surface of the first groove 21a, and is able to accommodate a retaining structure that will be described later (see FIG. 5). Here, a thickness dimension T1 of the cushion 4P at the position where the recessed portion 24 is typically formed is smaller than a thickness dimension T2 of the cushion 4P at a position where the grooves are normally formed. In this example embodiment, the thickness dimension of the cushion may also be ensured to some degree by the mounting portions 36. In this example embodiment, a pair of the second grooves 22 is formed on each side of the seat. Next, the pair of first grooves 21a and 21b is formed across in the seat width direction and the ends of both of these grooves are communicated with the second grooves 22. At this time, one of the first grooves 21a is arranged toward the front of the seat, and the other of the first grooves 21b is arranged toward the rear of the seat, parallel to the first groove 21a. Also, the recessed portion 24 is formed on both side portions of one of the first grooves 21a (i.e., the one toward the front of the seat).

The second cushion portion 24s is a member (that is generally rectangular) that is arranged in the housing portion 34, and includes the structures of the mountable portion 38 and the flow path portion 80 that will be described later (see FIGS. 3 to 5). The mountable portion 38 is a (linear) recessed portion in the surface (i.e., the surface facing the first cushion) of the second cushion portion 24s, and is able to receive (i.e., fit together with) the mounting portions 36 described above. In this example embodiment, a pair of the mountable portions 38 is formed extending in the seat width direction and arranged so that they are able to face the mounting portions 36. The mountable portions 38 are arranged facing the mounting portions 36, and a gap (a clearance C2) that enables the flow path portion 80 (i.e., a second communicating portion 84s) that will be described later to be formed is provided between the mountable portions 38.

The flow path portion 80 is a flow path that leads blown air from the blower 40 (to be described later) to the seating side (see FIGS. 3 to 6). The flow path portion 80 of this example embodiment includes first air holes 82f, a second air hole 82s, and communicating portions (i.e., a first communicating portion 84f and a second communicating portion 84s) (for simplicity, only some of the first air holes are denoted by reference characters in the drawings). The first air holes 82f are (generally circular) through-holes that extend through the first cushion portion 24f in the thickness direction. In this example embodiment, a plurality of the first air holes 82f is formed on the front side of the first cushion portion 24f. At this time, a plurality of the first air holes 82f are provided in positions forward of the one first groove 21a as well as in positions to the rear of the first groove 21a, and are in different positions than the recessed portion 24. Also, the second air hole 82s is a (generally rectangular) through-hole that extends through the second cushion portion 24s in the thickness direction, and is able to be communicated with the blower 40. In this example embodiment, the second air hole 82s is formed in a position to the rear of the second cushion portion 24s, and is in a different position than the recessed portion 24. In other words, the first air holes 82f and the second air hole 82s are formed in positions that are offset from the position of the recessed portion 24 when seen in the thickness direction of the cushion 4P.

Also, the communicating portion is a portion that communicates the first air holes 82f with the second air hole 82s, and includes first communication portions (84fa and 84fb), and a second communicating portion 84s. The first communicating portions 84fa and 84fb) are (linear) recessed portions formed in the back surface (i.e., the underneath surface) of the first cushion portion 24f. In this example embodiment, the first communicating portion 84fa may be formed in a position (a position in the cushion that is different from the position of the recessed portion 24) forward of the first groove 21a, and the first communicating portion 84fb may be formed in a position (a position in the cushion that is different from the position of the recessed portion 24) to the rear of the first groove 21a. In other words, each of the first communicating portions 84fa and 84fb is formed in a position that is offset from the poison of the recessed portion 24 when seen in the thickness direction of the cushion 4P. For example, in this example embodiment, a generally U-shaped first communicating portion 84fa is formed in a position forward of the first groove 21a. The front end side of the generally U-shaped first communicating portion 84fa branches out and is communicated with the first air holes 82f arranged forward of the groove (see FIG. 4). Also, the linear communicating portion 84fb is formed in a position to the rear of the first groove 21a. The linear communicating portion 84fb is communicated at both end portions with the first communicating portions 82f arranged to the rear of the groove.

Also, the second communicating portion 84s is a (linear) recessed portion formed on the surface of the second cushion portion 24s (see FIG. 3). In this example embodiment, the second communicating portion 84s is formed between (i.e., in a position in the cushion that differs from the position of the recessed portion 24) the pair of mountable portions 38. In other words, the second communicating portion 84s is formed in a position that is offset from the position of the recessed portion 24 when seen in the thickness direction of the cushion 4P. The second communicating portion 84s is provided extending from the second air hole 82s toward the front of the seat (i.e., to a position where the groove cuts across). Then the first cushion portion 24f and the second cushion portion 24s are abutted against one another as will be described later. At this time, at least a portion of the second communicating portion 84s overlaps with both of the first communicating portions 84fa and 84fb, such that both communicating portions are in a communicated state.

Referring to FIGS. 3 to 5, the cushion 4P is attached onto the support member 15, while the second cushion portion 24s is attached to the first cushion portion 24f. At this time, in this example embodiment, the second cushion portion 24s is arranged in the housing portion 34, while the mounting portions 36 are fit into (i.e., positioned in) the mountable portion 38. In this way, the second cushion portion 24s is arranged abutting against the back side of the first cushion portion 24f that is different from the seating side (i.e., that is the side opposite the seating side), and the first communicating portions 84fa and 84fb overlap with the second communicating portion 84s, thereby communicating these communicating portions together. The first air holes 82f become communicated with the second air hole 82s via these communicating portions.

The blower 40 is a hollow case (having a short cylinder shape) that includes a blower mechanism 42, a first opening 44f, a second opening 44s, and a pipe member 46 (see FIG. 6). The pipe member 46 (typically bellows-shaped) is a pipe member that communicates the blower 40 with the flow path portion 80. Also, the blower mechanism 42 is a small diameter cylindrical member that is able to be housed in the blower 40. A centrifugal mechanism (i.e., a mechanism that blows air out in the centrifugal direction while drawing air in from the axial direction of the apparatus), for example, may be used as the blower mechanism 42. A multi-blade fan (a sirrocco fan), a plate fan, a turbo fan, an airfoil fan, and a limit load fan are examples that may be used as this type of blower mechanism 42. Also, the first opening 44f is a through-hole formed in the back surface of the blower 40 (i.e., in the axial direction of the apparatus), that is able to supply air (outside air) to the blower mechanism 42. Also, the second opening 44s is a through-hole formed in the peripheral surface (i.e., in the centrifugal direction of the apparatus) of the blower 40, that is able to expel (i.e., blow) the air blown from the blower mechanism 42 outside the apparatus.

In this example embodiment, the blower 40 is mounted to the bottom, in the center, of the support member 15 (to the rear of the second air hole 82s) (see FIG. 6). The blower 40 is able to be mounted to the support member 15 using a fastener, not shown. Also, one end of the pipe member 46 is communicated with the second opening 44s, and the other end of the pipe member 46 is connected to the second air hole 82s. As a result, air blown out from the blower 40 is able to pass through the flow path portion 80 (i.e., the second air hole 82s, the communicating portions 84fa, 84fb, and 84s, and the first air holes 820 and be supplied to an occupant.

Figure 7:
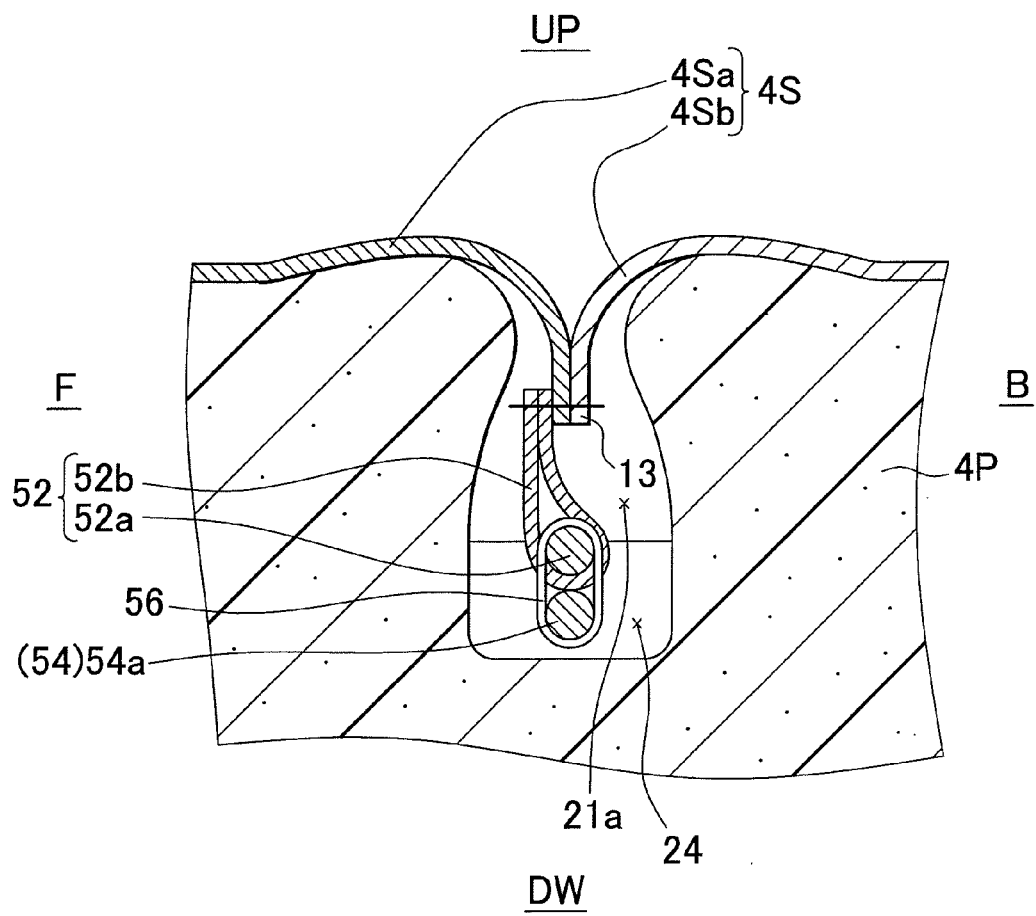
FIG. 7 is a longitudinal sectional view of a portion of the cushion and a portion of a cover.

The cover 4S is a bag-shaped member that covers the cushion 4P, and may be formed by sewing a plurality of cover pieces (4Sa and 4Sb) together (see FIGS. 6 and 7). The cover 4S (i.e., the material thereof) is not particularly limited, and may be breathable fabric (woven, knit, or non-woven), for example. In this example embodiment, the end portions of adjacent cover pieces (4Sa and 4Sb) are folded in and placed together face-to face so as to form an inner lapped portion 13. The inner lapped portion 13 (i.e., a portion of the cover) has a linear shape that protrudes toward the inside of the seat and extends in the seat width direction or the seat longitudinal direction. The inner lapped portion 13 is tucked inside the recessed portion 24 and retained there by a retaining structure that will be described later.

The retaining structure includes a retaining portion 52, a retained portion 54, and a ring member 56 (see FIG. 7). The ring member 56 is a generally C-shaped member, and is closed (to form a general O-shape) by a tool or the like. The retaining portion 52 includes a first wire 52a and a cloth member 52b. The first wire 52a (that is a rod-shaped member) has a length dimension that enables it to be arranged along the inner lapped portion 13. Also, the cloth member 52b is a band-shaped member that is able to be arranged along the inner lapped portion 13. In this example embodiment, the cloth member 52b is folded in and attached to the inner lapped portion 13. Also, the first wire 52a is inserted into the cloth member 52b and made to extend in the seat width direction. Further, the retained portion 54 is a portion formed inside the recessed portion 24, and includes a second wire 54a. This second wire 54a is a rod-shaped member that is embedded in the cushion 4P. In this example embodiment, the second wire 54a is embedded in the first cushion portion 24f and arranged in the seat width direction. Also, the second wire 54a is exposed from the recessed portion 24 so as to be able to face the first wire 52a.

Referring to FIGS. 6 and 7, the cushion 4P is covered by the cover 4S, while the retaining portion 52 is retained by the retained portion 54. In this example embodiment, the inner lapped portion 13 is retained in the recessed portion 24 while being tucked into the plurality of grooves (21a, 21b, and 22). At this time, the first wire 52a and the second wire 54a are passed through the ring member 56 while the inner lapped portion 13 is tucked into the recessed portion 24, and then the ring member 56 is closed. As a result, the inner lapped portion 13 (i.e., a portion of the cover) can be retained in the recessed portion 24, while the cushion 4P is covered by the cover 4S (thus yielding an extremely convenient structure).

Referring to FIG. 6, air blown out from the blower 40 is blown at an occupant through the flow path portion 80, while outside air is supplied to the blower 40. At this time, in this example embodiment, the flow path portion 80 is formed in a different (offset) position from that of the recessed portion 24 when seen in the thickness direction of the cushion 4P (see FIGS. 3 to 5). Therefore, the blown air from the blower 40 can be led to the seating side without making the thickness of the cushion 4P extremely thin (thus yielding a structure with good blowing efficiency). That is, in this example embodiment, the thickness dimension of the cushion 4P at the position where the recessed portion 24 is formed can be kept appropriate, so air leakage at that location can be prevented or reduced (see FIG. 5).

As described above, in this example embodiment, the flow path portion 80 is provided at a portion of the cushion 4P that is different (offset) from the position where the recessed portion is formed when seen in the thickness direction of the cushion 4P. Therefore, the inner lapped portion 13 can be retained in the recessed portion 24 without making the thickness of the cushion 4P extremely thin (thus yielding a structure with good blowing efficiency), and in addition, the blown air from the blower 40 can be led to the seating side. Also, in this example embodiment, forming the flow path portion 80 by the first cushion portion 24f and the second cushion portion 24s (that are made of the same material) enables seating comfort and the like to be well maintained. Therefore, with this example embodiment, blown air from the blower 40 is able to be efficiently led to a seating side, while maintaining seat performance as much as possible.

The vehicle seat according to this example embodiment is not limited to the example embodiment described above. That is, other various example embodiments are also possible.

(1) In the example embodiment, an example is described in which a portion of the cover (i.e., a first member) is tucked into the recessed portion 24, but the type of the first member is not limited. The first member may be, for example, any of a variety of types of planar-shaped members arranged on the surface of a seat structure member such as a heater member or a sensor member. For example, the heater member is a planar-shaped member that can be arranged on the surface of the seat, and includes a first heater portion, a second heater portion, and a communicating portion. The communicating portion is a portion that connects the first heater portion with the second heater portion (both of which have generally rectangular shapes). The communicating portion is typically a band-shaped portion that is narrower in width than the heater portions. Therefore, the communicating portion can be arranged tucked into the recessed portion 24 (i.e., compactly arranged), while the first heater portion and the second heater portion are arranged on the cushion 4P (see FIG. 5).

(2) Also in the example embodiment, the cushion 4P that includes the first cushion portion 24f and the second cushion portion 24s is given as an example, but the structure of the cushion is not limited. Further, the structures of the first cushion portion and the second cushion portion may be changed as appropriate. For example, a resin cover member may be used instead of the second cushion portion. The cover member may have a structure substantially the same as that of the second cushion portion and be arranged in the housing portion 34.

(3) Also in the example embodiment, the structures of the grooves (21a, 21b, and 22) and the recessed portion 24 are given as examples, but the structures of these portions (i.e., the positions and number thereof) are not limited. One or a plurality of recessed portions may be provided. Also, the recessed portion may be provided in at least a portion of the plurality of grooves.

(4) Also in the example embodiment, the structure (i.e., the position and number) of the flow path portion 80 is given as an example, but the structure of the flow path portion is not limited. For example, one or a plurality of each of the first air hole and the second air hole may be provided separately. Also, one or a plurality of each of the first communicating portion and the second communicating portion may be provided separately.

(5) Also in the example embodiment, the seat cushion 4 is described as an example, but the structure of example embodiment may be applied to a seat structure member such as a seat back.

What is claimed is:

1. A vehicle seat comprising:
   a seat structure member; and
   a first member that is arranged on a surface of the seat structure member,
   wherein the seat structure member includes:
   a cushion that defines a contour of a seat and elastically supports an occupant;
   a blower arranged in the seat structure member;
   a groove provided on a seating side of the cushion; and
   a recessed portion defined in a bottom surface of the groove,
   wherein a portion of the first member is disposed within the recessed portion; and
   a flow path through which air blown out from the blower is blown to the seating side is defined in the cushion, the flow path being provided in a portion of the cushion that is offset from a position where the recessed portion is defined such that the air blown out from the blower bypasses the recessed portion.

2. The vehicle seat according to claim 1, wherein the cushion includes:
   a first cushion portion that defines the seating side;
   the recessed portion provided on a seating side of the first cushion portion; and
   a second cushion portion that comprises a same material as a material of the first cushion portion,
   wherein the flow path includes:
   a first air hole that passes through the first cushion portion;
   a communicating portion provided between the first cushion portion and the second cushion portion; and
   a second air hole that passes through the second cushion portion and is in communication with the blower,
   wherein the second cushion portion is arranged to abut against a back surface of the first cushion portion that is on a side opposite the seating side, and air that is blown out from the blower is led to the seating side of the cushion by the first air hole being in communication with the second air hole by the communicating portion.

3. The vehicle seat according to claim 1, wherein the first member is a cushion cover.

4. The vehicle seat according to claim 1, wherein the cushion comprises a first cushion portion that defines the seating side and a second cushion portion beneath the first cushion portion, one of the first cushion portion and the second cushion portion having a mounting protrusion and the other of the first cushion portion and the second cushion portion having a mounting recess configured to receive the mounting protrusion.

5. The vehicle seat according to claim 4, the mounting protrusion comprising two spaced mounting protrusions, a space between the two spaced mounting protrusions comprising a part of the flow path.

6. The vehicle seat according to claim 1, wherein the air flow to the seating side passes through a plurality of air holes provided in an upper surface of the cushion.

7. The vehicle seat according to claim 1, the groove comprising groove portions extending in a width direction and in a length direction of the seating side of the cushion.

8. The vehicle seat according to claim 1, the recess configured to receive lapped portions of the first member.

9. The vehicle seat according to claim 1, wherein the first member comprises a heater.

* * * * *